US009156496B2

(12) United States Patent
Greenwood et al.

(10) Patent No.: US 9,156,496 B2
(45) Date of Patent: Oct. 13, 2015

(54) VEHICLE MANEUVERING AIDS

(75) Inventors: Jeremy John Greenwood, Sutton Coldfield (GB); Stephen Nicholls, Witney (GB); Andrew Stephen Bell Crawford, Warks (GB)

(73) Assignee: Ford Global Technologies, LLC, Dearborn, MI (US)

( * ) Notice: Subject to any disclaimer, the term of this patent is extended or adjusted under 35 U.S.C. 154(b) by 812 days.

(21) Appl. No.: 13/448,529

(22) Filed: Apr. 17, 2012

(65) Prior Publication Data

US 2012/0200706 A1 Aug. 9, 2012

Related U.S. Application Data

(62) Division of application No. 11/936,860, filed on Nov. 8, 2007, now abandoned.

(30) Foreign Application Priority Data

Mar. 21, 2007 (GB) .................................. 0705336.6

(51) Int. Cl.
*H04N 7/18* (2006.01)
*B62D 13/06* (2006.01)
(Continued)

(52) U.S. Cl.
CPC . *B62D 13/06* (2013.01); *B60R 1/00* (2013.01); *B62D 15/024* (2013.01); *G01B 11/272* (2013.01); *G06T 7/0008* (2013.01); *G06T 7/20* (2013.01); *G08G 1/167* (2013.01);
(Continued)

(58) Field of Classification Search
CPC .... B60R 1/00; B60R 2300/105; B60R 11/04; B60R 2300/802; B60R 2300/101; B60R 2300/301; B60R 2300/305; B60R 2300/806; B60R 2300/8093; H04N 7/181; B62D 13/06; B62D 15/024; G01B 11/272; G06T 7/008; G06T 7/20; G08G 1/16; G08G 1/167
USPC ........................................................ 348/148
See application file for complete search history.

(56) References Cited

U.S. PATENT DOCUMENTS

| | | | |
|---|---|---|---|
| 4,651,201 | A | 3/1987 | Schoolman |
| 4,931,930 | A | 6/1990 | Shyu et al. |

(Continued)

FOREIGN PATENT DOCUMENTS

| | | | |
|---|---|---|---|
| DE | 2919831 | A1 | 11/1980 |
| DE | 3625025 | C1 | 10/1987 |

(Continued)

OTHER PUBLICATIONS

"Around View Monitor", Infinity, Autoblog.com by Damon Lavrinc, Nissan release, Tokyo, Oct. 12, 2007, 6 pages.

(Continued)

*Primary Examiner* — Shan Elahi
(74) *Attorney, Agent, or Firm* — Raymond L. Coppiellie; Brooks Kushman P.C.

(57) ABSTRACT

A vehicle 1 towing a trailer 4 is fitted with three video cameras 5, 6, 7 fitted to the rear of the vehicle and on each door mirror. A view from any camera can be presented to the driver on a display 11. A predicted trailer path, calculated in a computing unit 10, is also presented to the driver on the display 11 as guide lines overlaid on the camera view. The computing unit 10 is also configured to calculate a hitch angle by tracking the position of a trailer-mounted marker in the camera view.

7 Claims, 3 Drawing Sheets

4
H
R
24
25
$\theta_t$
$\theta_c$
$\theta_o$
2
5
1
$\theta_s$

(51) Int. Cl.
*B60R 1/00* (2006.01)
*B62D 15/02* (2006.01)
*G01B 11/27* (2006.01)
*G06T 7/00* (2006.01)
*G06T 7/20* (2006.01)
*G08G 1/16* (2006.01)

(52) U.S. Cl.
CPC ..... *B60R2300/101* (2013.01); *B60R 2300/301* (2013.01); *B60R 2300/305* (2013.01); *B60R 2300/806* (2013.01); *B60R 2300/8093* (2013.01); *G08G 1/16* (2013.01)

(56) References Cited

U.S. PATENT DOCUMENTS 5,027,200 A * 6/1991 Petrossian et al. ............ 348/118
5,029,948 A 7/1991 Breen et al.
5,097,250 A 3/1992 Hernandez
5,108,123 A 4/1992 Rubenzik
5,108,158 A 4/1992 Breen
5,134,352 A 7/1992 Matsumoto et al.
5,172,961 A 12/1992 Inoue et al.
5,191,328 A 3/1993 Nelson
5,247,442 A 9/1993 Kendall
5,329,451 A 7/1994 Notsu
5,411,322 A 5/1995 Breen
5,455,557 A 10/1995 Noll et al.
5,461,357 A 10/1995 Yoshioka et al.
5,558,350 A * 9/1996 Kimbrough et al. .......... 280/426
5,587,938 A 12/1996 Hoetzel
5,646,614 A 7/1997 Abersfelder et al.
5,650,764 A * 7/1997 McCullough ................ 340/431
5,696,681 A 12/1997 Hrovat et al.
5,747,683 A 5/1998 Gerum et al.
5,863,057 A 1/1999 Wessels
5,947,637 A 9/1999 Neuling
5,956,181 A * 9/1999 Lin .............................. 359/630
6,021,367 A 2/2000 Pilutti et al.
6,042,196 A * 3/2000 Nakamura et al. ............... 303/7
6,059,383 A 5/2000 Paggi et al.
6,076,033 A 6/2000 Hamada et al.
6,078,849 A 6/2000 Brady et al.
6,100,795 A 8/2000 Otterbacher et al.
6,132,014 A 10/2000 Kiso et al.
6,259,357 B1 7/2001 Heider
6,292,094 B1 9/2001 Deng et al.
6,338,015 B1 1/2002 Kawagoe et al.
6,374,162 B1 4/2002 Tanaka et al.
6,476,730 B2 11/2002 Kakinami et al.
6,523,911 B1 * 2/2003 Rupp et al. ........................ 303/7
6,539,288 B2 * 3/2003 Ishida et al. ..................... 701/1
6,587,760 B2 7/2003 Okamoto
6,588,858 B2 7/2003 Ritz et al.
6,612,394 B2 9/2003 Wessman
6,690,413 B1 2/2004 Moore
6,693,524 B1 2/2004 Payne
6,704,637 B1 3/2004 Hrazdera et al.
6,734,787 B2 5/2004 Ikeda
6,778,891 B2 8/2004 Tanaka et al.
6,801,125 B1 10/2004 McGregor et al.
6,838,979 B2 * 1/2005 Deng et al. ................... 340/431
6,891,563 B2 5/2005 Schofield et al.
6,956,468 B2 10/2005 Lee et al.
6,959,970 B2 11/2005 Tseng
7,053,795 B2 5/2006 Maemura et al.
7,089,101 B2 8/2006 Fischer et al.
7,425,889 B2 9/2008 Widmann et al.
7,640,089 B2 * 12/2009 Deng et al. ...................... 701/42
8,838,353 B2 * 9/2014 Wu et al. ......................... 701/70
9,014,901 B2 * 4/2015 Wang et al. ..................... 701/24
2002/0084916 A1 7/2002 Shimizu et al.
2002/0145663 A1 * 10/2002 Mizusawa et al. ............ 348/118
2003/0234512 A1 12/2003 Holub
2004/0036601 A1 2/2004 Obradovich
2004/0041942 A1 3/2004 Jones
2004/0215374 A1 10/2004 Shepard
2004/0220724 A1 11/2004 Hahn et al.
2005/0000738 A1 * 1/2005 Gehring et al. .............. 180/14.1
2005/0104322 A1 5/2005 Swannie
2005/0193603 A1 9/2005 Schultz et al.
2005/0200700 A1 9/2005 Schofield et al.
2005/0206224 A1 9/2005 Lu
2005/0206225 A1 * 9/2005 Offerle et al. .................... 303/7
2005/0206226 A1 9/2005 Lu et al.
2005/0206229 A1 9/2005 Lu et al.
2005/0206231 A1 9/2005 Lu et al.
2005/0206232 A1 9/2005 Offerle
2005/0206233 A1 9/2005 Offerle et al.
2005/0206234 A1 9/2005 Tseng et al.
2005/0206235 A1 9/2005 Tseng
2005/0209762 A1 9/2005 Lu et al.
2005/0209763 A1 9/2005 Offerle et al.
2005/0236894 A1 10/2005 Lu et al.
2005/0236896 A1 10/2005 Offerle et al.
2006/0076828 A1 4/2006 Lu et al.
2006/0139483 A1 6/2006 Jung
2006/0244579 A1 11/2006 Raab
2008/0231701 A1 * 9/2008 Greenwood et al. .......... 348/148

FOREIGN PATENT DOCUMENTS

DE 4224887 A1 9/1993
DE 19702688 A1 7/1998
DE 19910153 A1 1/2001
DE 102005045196 A1 9/2006
DE 102005051804 B4 11/2007
EP 0358973 A2 3/1990
EP 0239592 B1 3/1991
EP 0295396 B1 7/1992
EP 0841648 A2 5/1998
EP 1038744 A1 9/2000
EP 1253065 A2 10/2002
EP 1529689 A1 5/2005
EP 1593552 B1 3/2007
GB 2188012 A 9/1987
GB 2320326 A 6/1998
GB 2344481 A 6/2000
GB 2356612 A 5/2001
GB 2398048 A 8/2004
GB 2398049 A 8/2004
GB 2398050 A 8/2004
JP 0612597 A 1/1994
JP 08241499 A 9/1996
JP 10129461 A 5/1998
JP 11157404 A 6/1999
JP 2000127851 A 5/2000
JP 2001055099 A 2/2001
JP 2001109999 A 4/2001
JP 2001206211 A 7/2001
JP 2002012172 A 1/2002
JP 2002068032 A 3/2002
JP 2002120775 A 4/2002
JP 2002172988 A 6/2002
JP 2002181518 A 6/2002
JP 2003148938 A 5/2003
JP 2012162215 A 8/2012
WO 9831146 A1 7/1998
WO 0044605 A1 8/2000
WO 0225291 A2 3/2002
WO 2004007232 A1 1/2004
WO 2004088611 A1 10/2004
WO 2006042665 A1 4/2006

OTHER PUBLICATIONS

BMW X5 System, bmw.com, Oct. 16, 2007, 1 page.
2007 Audi A6 System, cnet.com, Editor's Review, Oct. 26, 2007, 5 pages.
Mercedes S550 System, by Aaron Gold, About.com, 2007, 8 pages.
Great Britain Search Report for Appln. No. GB0400828.0, May 25, 2004, 3 pages.
Great Britain Search Report for Appln. No. GB0400831.4, May 24, 2004, 3 pages.

(56) References Cited

OTHER PUBLICATIONS

Great Britain Examination Report for Appln. No. GB0400828.0, Oct. 14, 2005, 2 pages.
Great Britain Search Report for Appln. No. GB0302835.4, Mar. 10, 2003, 3 pages.
Great Britain Search Report for Appln. No. GB0302837.0, Mar. 14, 2003, 3 pages.
Great Britain Search Report for Appln. No. GB0302841.2, Mar. 11, 2003, 2 pages.
Great Britain Search Report for Appln. No. GB0400825.6, May 25, 2004, 3 pages.

* cited by examiner

VEHICLE MANEUVERING AIDS

CROSS-REFERENCE TO RELATED APPLICATIONS

This application is a division of U.S. application Ser. No. 11/936,860 filed Nov. 8, 2007, which claims foreign priority benefits under 35 U.S.C. §119(a)-(d) to UK 0705336.6, filed Mar. 21, 2007, the disclosures of which are hereby incorporated by reference.

BACKGROUND

This invention relates to maneuvering aids for vehicles and particularly for vehicles which are towing a trailer, such as a caravan.

It is known to equip vehicles with external video cameras for displaying to the driver an image of the surroundings in order to provide assistance with parking and reversing maneuvers. A track for a given steering angle can be superimposed on the displayed image including systems that display the view from a rearward-looking video camera onto a touch screen which is used to input a desired destination, such as a parking bay. Steering cues are also displayed on the screen for assisting the driver in the maneuvering operation.

SUMMARY

A first feature provides a method for determining hitch angle in a vertical or horizontal plane between a vehicle and a trailer attached to the vehicle by means of a tow hitch. The method includes the steps of tracking a marker associated with the trailer across a field of view of a rearward-looking video camera and converting a lateral displacement of the marker in the field of view to an angular displacement.

A second feature provides a means for predicting a path of a trailer and displaying the predicted path to the driver of a vehicle to which the trailer is attached. The path being displayed as an overlay on a view from a vehicle-mounted video camera. One method of predicting the trailer path includes the steps of determining a hitch angle, θt, between the vehicle and trailer, determining a hitch length, H, between an axle of the trailer and a point of attachment of the trailer to the vehicle, calculating a turning radius R where R =H/θt, where the trailer is predicted to follow the circumference of a circle of radius R. A view from a video camera mounted on the rear of the vehicle or on a door mirror is utilized.

A third feature tracks obstacles close to the path of a vehicle using multiple vehicle-mounted video cameras with pan and zoom capability. One method of tracking these obstacles includes the steps of detecting the proximity of an obstacle using a vehicle-mounted proximity sensor, panning a vehicle-mounted video camera towards the location of the obstacle, and displaying a video camera view of the obstacle to a driver of the vehicle.

A fourth feature reliably informs the vehicle and driver when a trailer is hitched to the vehicle. This is so that systems concerned with dynamic stability control or active suspension, e.g. can be set to the correct operating conditions. Systems that only monitor the trailer's electrical connection cannot distinguish between a trailer and light bars. A rearward-looking camera may be used to detect the presence of a trailer. One method of detecting the trailer includes the steps of comparing an image from a rearward-looking, vehicle mounted video camera with stored data representing a trailer.

A fifth feature provides a method for assisting in hitching a trailer to a vehicle. One method of assisting includes the steps of displaying a view from a rearward-looking, vehicle-mounted video camera on a screen visible to the driver, identifying a tow hitch in the displayed view, zooming the camera view to display a close-up of the vehicle's tow ball and the trailer's tow hitch and adjusting the camera's zoom facility as the vehicle and trailer move relative to one another to maintain a displayed view of the tow ball and hitch.

A sixth feature includes using one or more vehicle-mounted cameras configured to detect strobed light, such as that emitted by emergency vehicles. A warning message can then be generated for display to the driver of the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
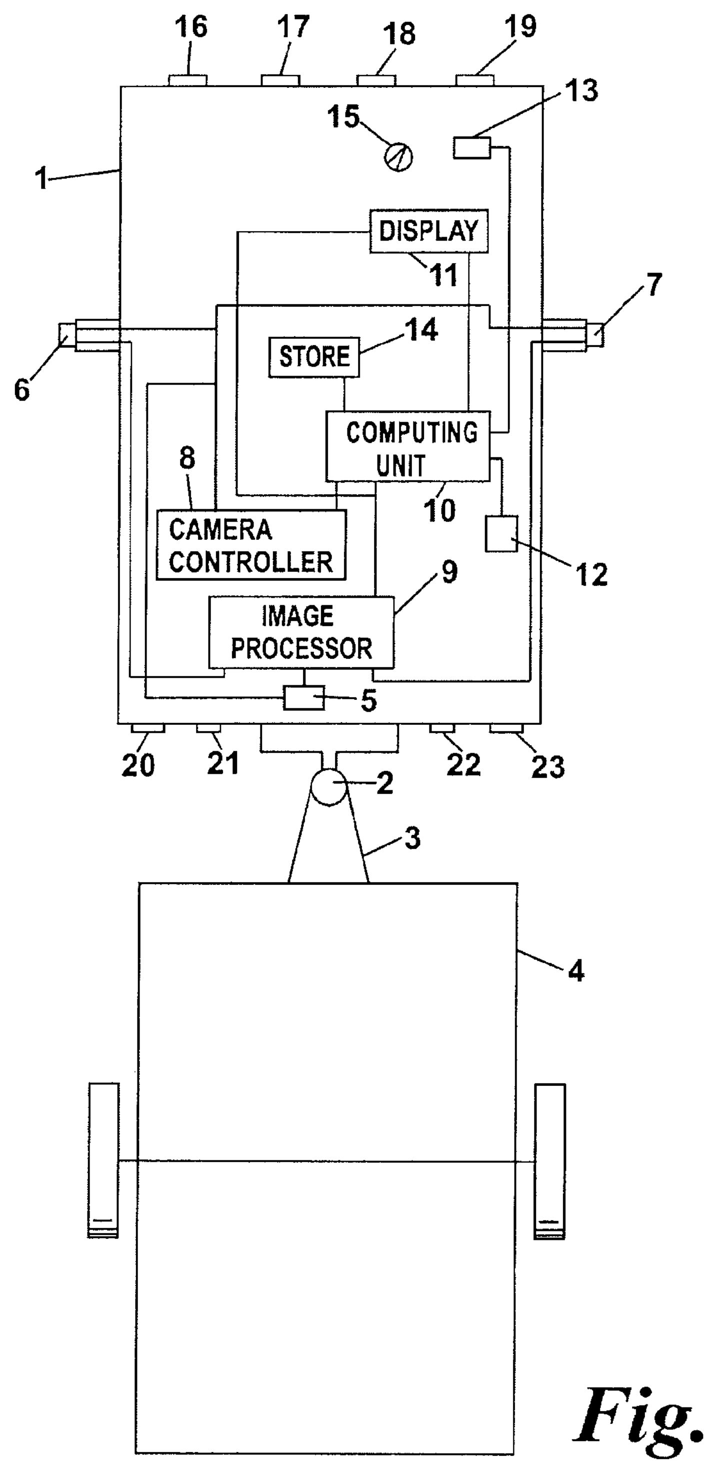
FIG. 1 is a schematic view of a trailer and vehicle, the latter incorporating apparatus for effecting methods of assisting maneuvers of the trailer-vehicle combination.

In FIG. 1 a vehicle 1 is provided with a tow ball 2 to which the hitch 3 of a trailer 4 is attached.

The vehicle 1 is fitted with three video cameras. A first video camera 5 is mounted on the rear of the vehicle 1 and looks rearwards towards the trailer 4. This rearward-looking camera has a zoom facility. Two door mirror mounted video cameras 6, 7 are also provided. These door mirror mounted cameras 6, 7 may be panned so that they look forwards, rearwards and to a side of the vehicle 1. All three cameras 5, 6, 7 are controlled by a camera controller 8 and the outputs from each camera are fed to an image processor 9.

Outputs of the image processor 9 are fed to a computing unit 10 and display screen 11 and the camera controller 8. The computing unit 10 generates signals for controlling the camera controller 8 and display screen 11 which is visible to the driver of the vehicle 1. The computing unit 10 receives signals from a speed sensor 12, a steering angle sensor 13 and a vehicle and trailer parameter store 14. A mode selector switch 15 has an output which is connected to the image processor 9.

Ultrasonic parking distance sensors 16-23 are provided on the front and the rear of the vehicle. Their outputs are connected to the camera controller 8. Four sensors are fitted at each end of the vehicle in order to give good coverage and resolution.

Operation of a first embodiment, comprising a method of measuring the hitch angle (in a horizontal plane between the vehicle 1 and the trailer 4) will now be described with reference to FIGS. 1 and 2. The method utilizes a tracking marker such as a mark or sticker attached to the trailer or a vertical edge of the trailer which is visible to the rearward-looking video camera 5. The image processor 9 locates this marker within the camera's field of view and feeds this information to the computing unit 10 which calculates the hitch angle.

Figure 2:
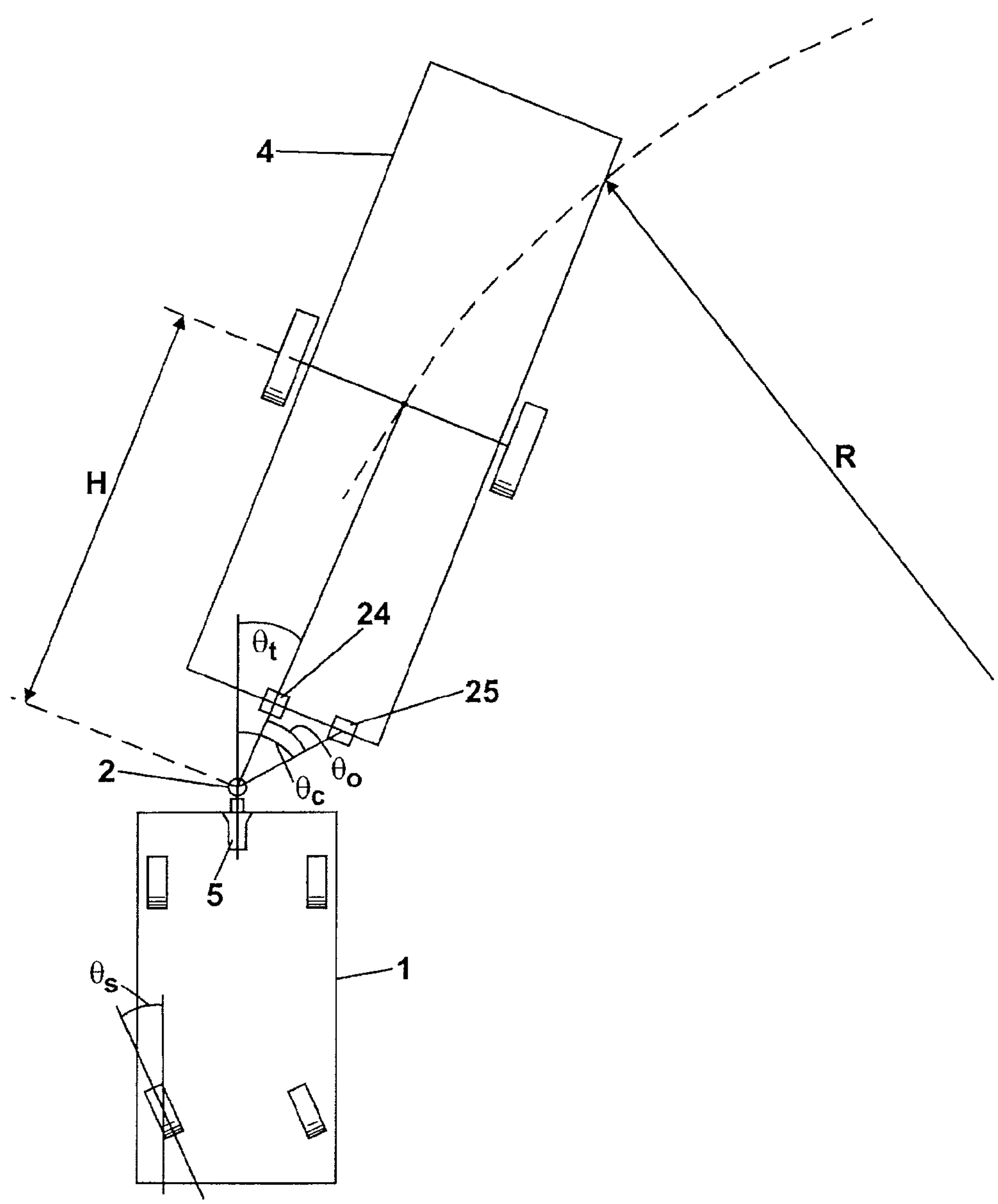
FIGS. 2 and 3 are plan views of the vehicle-trailer combination of FIG. 1 showing certain geometrical parameters of the combination.

In a first example, a high visibility marker 24 is placed on the center-line of the trailer 4 (see FIG. 2). From knowledge of the trailer and vehicle geometric parameters e.g. tow hitch length (held in the store 14) and the position of the marker within the camera's 5 field of view, the computing unit 10 can calculate the hitch angle θt.

Placement of the marker on the trailer's center-line may not always be possible or convenient. So in a second example, a marker 25 is placed offset from the center-line by an offset angle θo. Then, the hitch angle =θc−θo where θc is the target angle which is calculated in the computing unit 10.

The offset angle θo is derived by the computing unit 10, in a learning phase, by noting the value of θc when the vehicle is traveling in a straight line, i.e. when the steering angle sensor 13 outputs a value of zero for steering angle θs. So, when this condition is fulfilled, θo=θc, so the offset angle is now known.

Extending the principle of the above second example, the image processor 9 can pick out its own marker on the trailer 4. This could be a caravan window or an edge of the trailer, for example. The feature selected can be highlighted on the display screen 11 so that the driver can confirm that it is actually rigidly connected to the trailer. The computing unit 10 is then adapted to compare the movement of this target with steering movements and check for any anomalies.

As a refinement to the hitch angle calculation, some averaging of the measurements is carried out, particularly in the learning phase. This helps to cancel out the errors due to flexing of the trailer structure.

The learning phase can be eliminated on trailer re-use. The computing unit 10 can store the learned geometry of the trailer so that it can be recalled. Alternatively, the learning phase can be run continually as a check on the stored values with updating as required. This continual check is useful in any case as a compensation for drift due to other variables.

By comparing the measured hitch angle θt with a reference value held in the store 14 for a given trailer length, the computing unit 10 can detect the onset of jack-knifing while reversing. When this occurs, the computing unit 10 generates a warning signal to the driver. This warning can be audible or a visual signal on the display screen 11.

In addition to measuring hitch angle, the invention provides a method for measuring the pitch angle (i.e. in a vertical plane), between the vehicle 1 and trailer 4. Pitch angle is usually zero or close to zero but can deviate from zero when traveling on uneven ground or reversing down a slipway, for example. The same principles apply, with the image processor 9 selecting a mark or horizontal edge of the trailer. By comparing the pitch angle determined by the computing unit 10 with a reference value, the unit 10 can detect imminent grounding of the hitch 3 and signal a warning to the driver.

A second embodiment of the invention provides a method of predicting a trailer reversing path and displaying it to the driver by means of an overlay on the display.

Say, for example, the driver needs to reverse the vehicle and trailer combination into a parking bay.

Knowing the hitch angle θt, (either from the method of the first embodiment described above or from some other method or sensor output), and the hitch length H (the distance between the trailer's axle and tow hitch, see FIG. 3) the computing unit 10 computes a trailer path.

Figure 3:
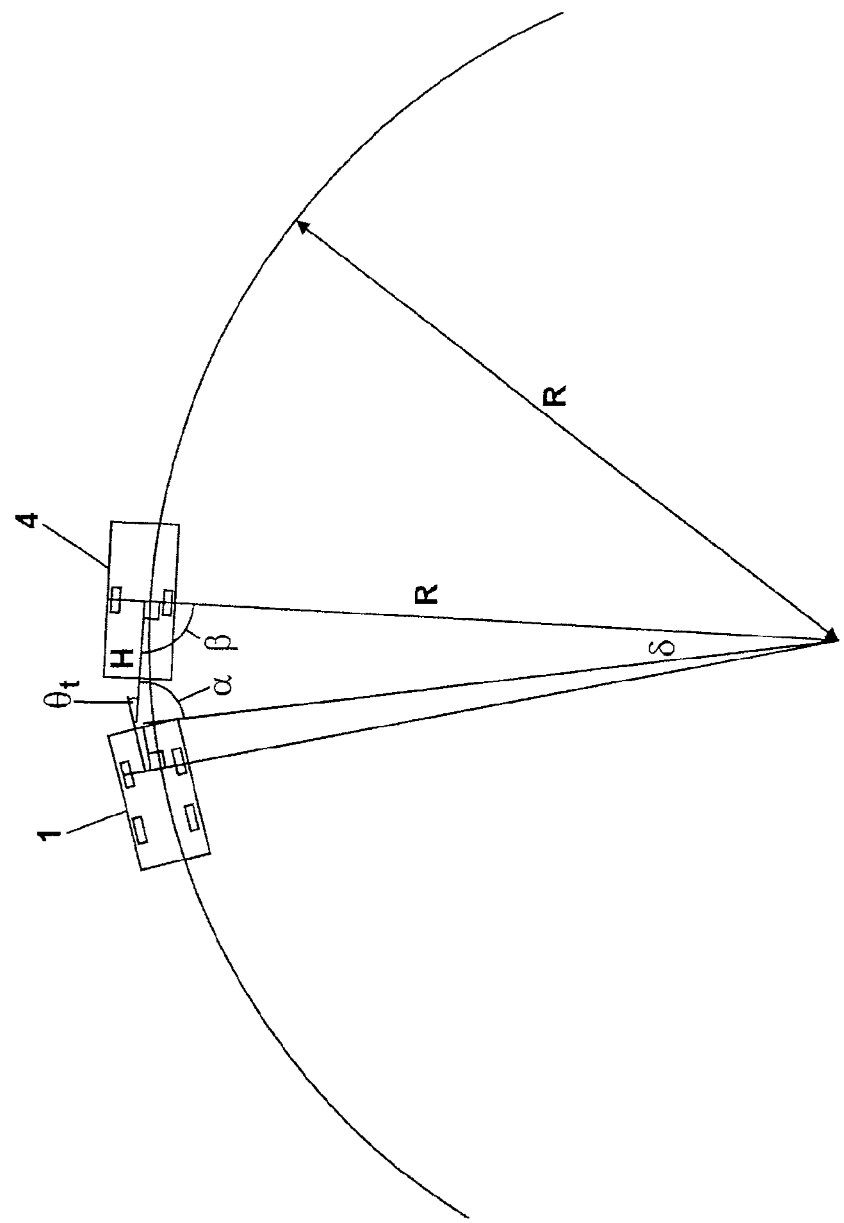

The path of the trailer 4 can be described by a turning radius R. In practice R and θt vary during the maneuver but for small steering angle movements can be assumed to be constant. With reference to FIG. 3, it can be seen that the hitch angle θt, hitch length H and turning radius R are associated approximately by equation:

$$\alpha+\beta+\delta=\pi$$

Substituting $\beta=\pi/2$ and $\alpha=\pi/2-\theta t$ gives $\theta t=\delta$ $\tan\delta=H/R=\delta=\theta t$ for small $\theta t$ So $R=H/\theta t$ ($\theta t$ in radians) Equation (1)

The hitch length H may be manually entered into the store 14 for the particular trailer 4 or it may be calculated in the computing unit 10 while the driver performs the following maneuver.

The vehicle-trailer combination is driven in a circular path and R is derived from the steering angle, θs, and the dimensions of the vehicle. The value of θt is derived from the camera 5 view. These values are then inserted into equation (1) to give a value for H.

In an alternative learning process for hitch length, H, while the vehicle-trailer combination is being driven, the value of θt calculated from equation (1) using a calculated value for R (from steering angle and vehicle dimensions) and an estimate for H is compared with the measured value of θt. The value of H is varied in subsequent calculations until the best match is achieved with the measured value for θt. This value of H is then stored.

The path of the reversing trailer 4 computed by the computing unit 10 is displayed on the display screen 11 as an overlay on top of the view from one of the cameras 5, 6, 7. The path is computed by building up incremental changes as a function of θt and R. The projected path is continuously updated as the steering angle θs and consequently the hitch angle θt vary.

The path can be overlaid on the rear camera's view, but will only be useful to the driver if the rear corners of the trailer are also displayed, e.g. for a low trailer. For a large trailer, e.g. a caravan, this is not so useful. In this latter case, the projected path is overlaid on to a view from one of the door mirror mounted cameras 6, 7, specifically, the camera which can see the trailer 4 at that particular moment in the maneuver. A correction has to be applied, however, if the trailer path is calculated with respect to the rear camera view.

Any misalignment in either camera will introduce errors in the information presented to the driver. This is remedied by electronically adjusting the view from the camera by aligning the image (or at least, the pixel data) with known hard points on the vehicle. For example, the mirror camera is looking rearwards but is misaligned laterally. The image processor 9 re-aligns the image to correct the alignment. Taken to the extreme, this will allow the arrangement to be used with the mirror folded in.

This embodiment can be extended to show the path of the trailer wheels while traveling in a forwards direction so that "kerbing" of the inside trailer wheels can be avoided on sharp bends. Conveniently, the trailer's path can be overlaid on the view from a forward-looking, door mirror mounted camera.

The learning process can be eliminated on trailer re-use. The store 14 can store the learned geometry of the trailer so that it can be recalled. Reversing assistance is then available straight away. The learning process is then run continually as a check on the stored values with updating as required. This continual check is useful in any case as a compensation for drift due to other variables.

The overlay tracks showing the projected path of the trailer can, conveniently have their starting point at the trailer's wheels. If the pitch angle of the tow hitch changes markedly then the guide lines comprising the overlay can appear to be in mid air rather than on the ground. If the pitch angle is known, then the computing unit 10 can effect a correction to the guide lines.

Operation of a third embodiment of the invention, which facilitates the tracking of obstacles, will now be described.

In this example, the door mirror mounted cameras 6, 7 are triggered by one or more of the parking distance sensors 16 19 when the vehicle comes within close range of an object. On the display screen 11, the driver will be presented with a view of the obstacle and a part of the exterior of the vehicle closest to it.

In an off-road or other tight maneuvering situation, the driver may want to continue to observe the object while driving past it. For example, while driving past a boulder, the driver will want to ensure that the boulder is not contacted by the side of the vehicle.

Clearly it is possible for the driver to manually control the camera to adjust its aim while driving past the object. However, this requires intervention by the driver and may distract him/her from other driving tasks.

This embodiment makes use of the ability of the cameras 6, 7 to pan and zoom electronically.

By virtue of the parking distance sensors 16-23 the location of an object relative to the vehicle 1 is known. This information is fed to the camera controller 8 so that the most appropriately located camera can be panned and zoomed in towards the position of the detected obstacle.

As a further refinement, the computing unit 10 is also provided with the location of the object relative to the vehicle along with steering angle (from the sensor 13) and speed (from the speed sensor 12).

As the vehicle moves onwards, the relative position of the object can be calculated from the wheel speeds combined with the steering angle or from individual wheel speeds. Hence an approximate real time location can be calculated and the camera panned to follow the object without driver intervention, with the computing unit 10 providing a control signal for the camera controller 8.

There may be instances where the ground is slippery causing individual wheels to slip or the vehicle to slide. In such cases, speed measurements and/or steering measurements will be in error. To overcome this problem, the image processor 9 is adapted to analyze the image and match the object in the field of view between consecutive frames. This will allow ground velocity errors to be detected and corrected. For example, if the vehicle is sliding sideways towards the object, the camera can be made to pan towards the vehicle.

As a further enhancement to this second embodiment, the same recognition algorithm is employed in the image processor to enable the cameras 6, 7 to follow a moving object, following initial detection by the parking distance sensors 16-23.

For example, a child or animal which has been detected is shown as an image on the display screen 11 by the relevant camera. The image processor 9 then tracks the child's (or animal's) position through consecutive frames and the camera controller 8 adjusts pan and zoom controls to keep the moving object in the field of view.

The video cameras 5, 6, 7 may have an enhanced infra-red capability so that they are particularly sensitive in locating hot objects such as people and animals. Such "hot-spots" can be identified by the image processor 9 and highlighted on the display screen 11.

In an alternative arrangement, the zooming and panning operations are performed by the computing unit 10 instead of by the cameras 6, 7.

Operation of a fourth embodiment, which enables detection of a trailer, will now be described.

The rearward facing camera 5 detects the presence of the trailer 4 and sends its image to the computing unit 10 via the image processor 9. By comparing the received image with parameters stored in the store 14, the computing unit can determine the type of trailer, e.g. caravan, low loader etc. The size and shape of the trailer can thus give an indication of its weight and aerodynamic drag. This information can be used by vehicle systems such as stability control systems.

Once the vehicle-trailer combination is on the move, the trailer type can further be confirmed by monitoring the dynamic behavior of the combination using on-board sensors (not shown).

Operation of a fifth embodiment will now be described. This embodiment provides a means for assisting in attaching the trailer 4 to the vehicle 1.

Using the camera system shown, it is possible to simplify the trailer hitching process in that both the trailer and the tow hitch can be seen in a camera image by the driver. This allows hitching of a trailer without the need for external guidance.

However, the image must necessarily be wide to allow the trailer to be approached but then the image of the tow ball and hitch are small and difficult to resolve. Also, the driver's judgment is still required to steer the vehicle appropriately based on the image.

This embodiment provides a solution to both these problems. The rear camera image is processed in the image processor 9.

Firstly, the driver selects a "hitch mode" using the mode selector switch 15. In response, the image processor 9 selects the rear camera view to display on the screen 11 and searches for an object with the triangular shape and size characteristics of a typical A-frame tow hitch. When detected, the image is zoomed in to contain the vehicle tow ball 2 and the tow hitch 3. This can be done electronically by the computing unit 10 or by activating a zoom facility on the camera 5 via the camera controller 7.

There may be an optional "confirm" function for the driver to confirm that the identified object is the trailer or to adjust the location for unusually shaped hitches.

As the vehicle approaches (or moves away from) the trailer, the zoom setting is adjusted to maintain the view of both the hitch and tow ball. Consequently, when the tow ball 2 is close to the hitch 3, the driver will be given the optimum view to allow accurate alignment.

In an alternative mode of operation, the image processor 9 is continuously monitoring the rear camera's output and the driver does not need to use the mode selector switch. On detection of the hitch 3, the image processor 9 presents the rear camera view to the display 11.

Optionally, and as an additional safety feature, if the parking distance sensors 16-23 detect an object in the path of the vehicle and close enough to risk a collision but outside the zoomed image, the image is zoomed out to show the object.

In a further mode of operation of this fourth embodiment, the computing unit 10 generates an overlay image on the display screen 11 which is the projected trajectory of the tow ball 2. This is calculated from the vehicle's steering angle (provided by the steering angle sensor 13) and from vehicle geometry parameters held in the store 14. (This projected trajectory can assist in initially finding the hitch by panning the camera to look along the trajectory).

The trajectory is overlaid as a guide line on the zoomed image. In this way, the driver can adjust the steering angle to cause the trajectory and hitch to coincide. Reversing the vehicle will then place the hitch over the tow ball.

In some vehicles, it may not be possible to locate a camera on the body of the vehicle such that it has the view of the tow ball. For example, the tow ball may be obscured by the bumper. In this case, a "virtual tow ball" is applied to the image, i.e. a dot vertically above the actual location of the tow ball, to allow alignment and ranging of the hitching operation. The exact placement of the dot can be determined with reference to other fixed points in the image, e.g. the periphery of the vehicle as well as a predetermined absolute position. This allows for tolerance in the installation of the camera.

As the computing unit 10 knows the location of the tow ball 2 and the hitch 3 and also knows the current steering angle, it is possible to display to the driver instructions to steer left or right to optimize the alignment.

This could be integrated with other vehicle control mechanisms (not shown) such that the guidance information is applied automatically via the power steering system to steer the vehicle to align the tow hitch. The brake and throttle could be controlled automatically as well.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of predicting a path of a trailer attached to a vehicle comprising the steps of:

measuring a vehicle steering angle by a computing unit of a vehicle;

obtaining first and second views by an image processor of the vehicle, from at least two rearward-looking video cameras mounted on the vehicle;

determining a trailer view by the image processor, from the first and second camera views;

displaying the trailer view by the image processor on a screen visible to a driver;

determining a hitch angle, $\theta_t$, by the computing unit and a parameter store of the vehicle, between the vehicle and trailer and using the trailer view;

calculating a predicted path of the trailer by the computing unit, from the hitch angle and steering angle;

displaying the predicted trailer path by the image processor, as an overlaid track on the trailer view;

tracking a marker associated with the trailer by the image processor, across a field of view of at least one of the rearward-looking video cameras; and converting a vertical displacement of the marker by the computing unit in the field of view to an angular displacement to determine a pitch angle.

2. The method of claim 1, further comprising the steps of:

determining by the image processor, which of the first and second camera views shows the trailer; and displaying the determined view captured by the first and second cameras on the screen by the image processor.

3. The method of claim 1, further comprising the step of determining the hitch angle, $\theta_t$, by the computing unit and the parameter store, between the vehicle and trailer and using $\theta_t$ to calculate the predicted trailer path by the computing unit;

wherein the hitch angle $\theta_t$ is determined by the steps of:

tracking the marker associated with the trailer by the image processor, across a field of view of at least one of the rearward-looking video cameras, and converting a lateral displacement of the marker by the computing unit in the field of view to an angular displacement; and wherein the marker is placed on a center-line of the trailer.

4. The method of claim 1, further comprising the step of determining the hitch angle, $\theta_t$, by the computing unit and the parameter store, between the vehicle and trailer and using $\theta_t$ to calculate the predicted trailer path by the computing unit;

wherein the hitch angle $\theta_t$ is determined by the steps of:

tracking the marker associated with the trailer by the image processor, across a field of view of at least one of the rearward-looking video cameras, and converting a lateral displacement of the marker by the computing unit in the field of view to an angular displacement; and wherein the marker is placed offset from a center-line of the trailer.

5. The method of claim 1, further comprising the step of determining the hitch angle,$\theta_t$, by the computing unit and the parameter store, between the vehicle and trailer and using $\theta_t$ to calculate the predicted trailer path by the computing unit;

wherein the hitch angle $\theta_t$ is determined by the steps of:

tracking the marker associated with the trailer by the image processor, across a field of view of at least one of the rearward-looking video cameras, and converting a lateral displacement of the marker by the computing unit in the field of view to an angular displacement; and further comprising the step of selecting the marker on the trailer by the image processor of the vehicle.

6. The method of claim 5 further comprising the step of selecting a window on the trailer as the marker by the image processor of the vehicle.

7. The method of claim 5 further comprising the step of selecting an edge of the trailer as the marker by the image processor of the vehicle.

* * * * *